(No Model.)
K. W. HEDGES.
COMPOSITION FOR ATTACHING ANTIFRICTION LININGS OR FACINGS.
No. 499,111. Patented June 6, 1893.
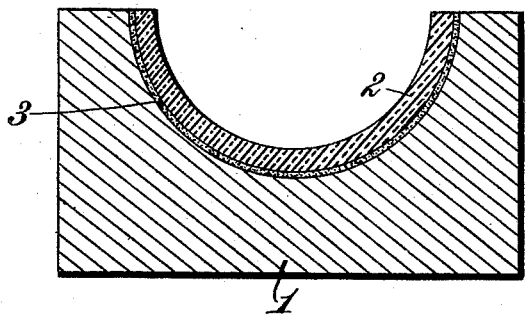
Witnesses.
Robert Everett.
J. H. Daly.
Inventor.
Killingworth W. Hedges.
By James L. Norris.
Atty.

UNITED STATES PATENT OFFICE.

KILLINGWORTH W. HEDGES, OF LONDON, ENGLAND.

COMPOSITION FOR ATTACHING ANTIFRICTION LININGS OR FACINGS.

SPECIFICATION forming part of Letters Patent No. 499,111, dated June 6, 1893.

Application filed August 2, 1892. Serial No. 441,944. (No specimens.)

*To all whom it may concern:*

Be it known that I, KILLINGWORTH WILLIAM HEDGES, a subject of the Queen of England, residing at No. 7 Carteret Street, Westminster, London, in the county of Middlesex, England, have invented a new and useful Improvement in Compositions for Attaching Antifriction Linings or Facings, of which the following is a specification.

This invention relates to journal boxes, bushes and other parts of machinery subject to frictional wear. In devices of this character an anti-friction lining or facing compound, containing carbon in the form of plumbago, is generally employed; but when these linings or facings are separate pieces they are usually fixed in position through the medium of screws, or other fastening devices, or if the composition admits of it they are pressed and baked in the position which they are permanently to occupy.

My invention has for its object to provide a new and improved composition for fixing or attaching such anti-friction lining or facing to metal.

To accomplish this object my invention consists in the features hereinafter described and claimed, reference being made to the accompanying drawing, in which the figure is a detail sectional view of one form of journal box embodying my invention.

In order to enable others skilled in the art to make and use my invention I will now describe the same in detail.

Referring to the drawing herein the numeral 1 indicates the metal portion of the journal box, and 2 the anti-friction lining or facing hereinbefore mentioned. The journal box or metal portion 1, illustrated in the drawing, is only typical of the many different forms of journal boxes, bushes, or other parts of machinery to which my invention is applicable.

In carrying my invention into effect, I mix up finely pulverized carbon, which may be in the form of plumbago, graphite, or lamp-black, with pitch or tar, and then I thoroughly kneed the mixture to the consistency of a soft putty. I apply this putty as a cement layer 3 interposed between the anti-friction lining or facing 2 and the metal 1 which is to be lined and faced. The metal does not require to be bored, turned, or otherwise tooled. After pressing the parts together I expose the whole to heat sufficient to vaporize and dispel the more or less volatile ingredients of the cement, and thus render the latter hard and firm. The proportions of the ingredients may be varied, but practically I find a good proportion to be about four parts of finely pulverized plumbago or graphite to one part of liquid coal tar. The temperature required for hardening the cement need not exceed 400° Fahrenheit. The composition of carbon and tar is a better conductor of heat than where mica is used in a composition bearing and consequently less heating of the bearing results by the employment of my invention. Further the adhesion is better than where mica is employed in a composition.

Having thus described my invention, what I claim is—

A means for fixing an anti-friction lining or facing on a metal foundation, said means consisting of carbon and tar pressed and baked in place between the lining or facing and the foundation, substantially as described.

In testimony whereof I have signed my name to this specification, in the presence of two subscribing witnesses, this 20th day of July, A. D. 1892.

KILLINGWORTH W. HEDGES.

Witnesses:
  WALTER J. SKERTEN,
  WILMER M. HARRIS,
*Both of 17 Gracechurch Street, London, E. C.*